(12) United States Patent
Jales Costa et al.

(10) Patent No.: US 10,769,799 B2
(45) Date of Patent: Sep. 8, 2020

(54) FOREGROUND DETECTION

(71) Applicant: Ford Global Technologies, LLC, Dearborn, MI (US)

(72) Inventors: Bruno Sielly Jales Costa, Santa Clara, CA (US); Enrique Corona, Canton, MI (US); Gintaras Vincent Puskorius, Novi, MI (US); Dimitar Petrov Filev, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 81 days.

(21) Appl. No.: 16/111,589

(22) Filed: Aug. 24, 2018

(65) Prior Publication Data
US 2020/0065978 A1 Feb. 27, 2020

(51) Int. Cl.
| | |
|---|---|
| *G06T 7/246* | (2017.01) |
| *G06K 9/62* | (2006.01) |
| *G08G 1/04* | (2006.01) |
| *G08G 1/01* | (2006.01) |
| *G08G 1/16* | (2006.01) |
| *B60W 30/09* | (2012.01) |
| *B60W 10/04* | (2006.01) |
| *B60W 10/18* | (2012.01) |
| *B60W 10/20* | (2006.01) |
| *G06K 9/00* | (2006.01) |

(52) U.S. Cl.
CPC ............. *G06T 7/248* (2017.01); *B60W 10/04* (2013.01); *B60W 10/18* (2013.01); *B60W 10/20* (2013.01); *B60W 30/09* (2013.01); *G06K 9/00785* (2013.01); *G06K 9/6202* (2013.01); *G08G 1/0112* (2013.01); *G08G 1/04* (2013.01); *G08G 1/166* (2013.01); *B60W 2420/42* (2013.01); *B60W 2554/00* (2020.02); *G06T 2207/10016* (2013.01); *G06T 2207/10024* (2013.01); *G06T 2207/30236* (2013.01)

(58) Field of Classification Search
CPC .............................. G06T 7/248; G06K 9/6202
See application file for complete search history.

(56) References Cited

U.S. PATENT DOCUMENTS

| | | | | |
|---|---|---|---|---|
| 5,768,401 A | * | 6/1998 | Csipkes | G02B 6/3843 382/255 |
| 5,787,199 A | | 7/1998 | Lee | |
| 6,678,413 B1 | * | 1/2004 | Liang | A61B 5/1113 382/181 |
| 8,094,943 B2 | | 1/2012 | Eaton et al. | |
| 8,611,593 B2 | | 12/2013 | Chen et al. | |
| 9,418,320 B2 | | 8/2016 | Chang et al. | |

FOREIGN PATENT DOCUMENTS

| | | |
|---|---|---|
| CN | 102201121 A | 9/2011 |
| CN | 101582160 B | 9/2013 |

* cited by examiner

*Primary Examiner* — Tuan H Nguyen
(74) *Attorney, Agent, or Firm* — Frank A. MacKenaie; Bejin Bieneman PLC

(57) ABSTRACT

A computing system can receive an image including foreground pixels. The foreground pixels can be determined based on determining eccentricity $\varepsilon_k$ based on a sequence of images acquired by a stationary sensor. The vehicle can determine moving objects in the image based on the foreground pixels. The vehicle can be operated based on the moving objects in the image.

20 Claims, 7 Drawing Sheets

FOREGROUND DETECTION

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway.

DETAILED DESCRIPTION

Figure 1:
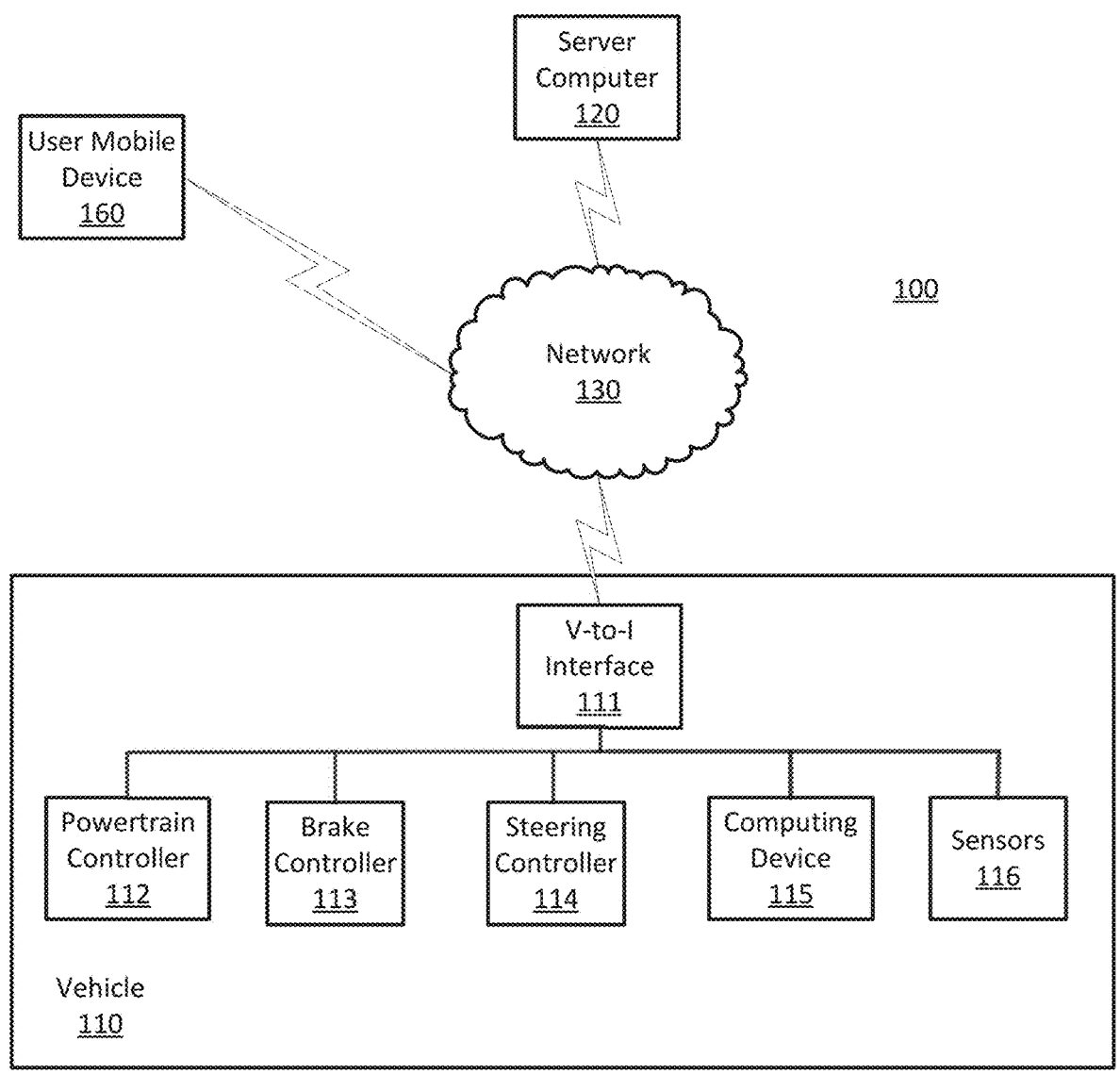
FIG. 1 is a block diagram of an example vehicle.

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding the external environment of a vehicle and to use the data to determine trajectories to be used to operate a vehicle in autonomous or semi-autonomous mode, for example, wherein the computing device can provide information to controllers to operate vehicle on a roadway in traffic including other vehicles. Based on sensor data, a computing device can determine moving objects including vehicles and pedestrians in the vicinity of a vehicle and operate a vehicle based on the moving objects. For example, a computing device can detect and identify moving objects in the vicinity of a vehicle and, based on detecting and identifying moving objects at a plurality of time periods, determine a velocity, including speed and direction, for the moving objects. Thus, the computing device enjoys improved accuracy in analyzing sensor, e.g., image, data, and in identifying and determining trajectories of, moving objects.

Disclosed herein is a method, including receiving an image including foreground pixels determined based on determining an eccentricity $\varepsilon_k$ for a sequence of images acquired by a stationary sensor, determining moving objects in the image based on the foreground pixels, and operating a vehicle based on the moving objects in the image. Eccentricity $\varepsilon_k$ can be determined based on determining a mean $\mu_k$ for pixels of the sequence of images, based on a previous mean $\mu_{k-1}$ according to equation $\mu_k=(1-\alpha)\mu_{k-1}+\alpha x_k$ where $\alpha$ is an empirically determined constant. The eccentricity $\varepsilon_k$ can be determined based on determining a variance $\sigma_k^2$ for pixels of the sequence of images, based on a previous variance $\sigma_{k-1}^2$ and a mean $\mu_k$ according to equation $$\sigma_k^2 = (1-\alpha)\sigma_{k-1}^2 + \frac{\alpha(x_k-\mu_k)^T(x_k-\mu_k)}{1-\alpha}.$$

The eccentricity $\varepsilon_k$ can be determined based on mean $\mu_k$ and variance $\sigma_k^2$ according to equation $$\varepsilon_k = \alpha + \frac{\alpha(x_k-\mu_k)^T(x_k-\mu_k)}{\sigma_k^2}.$$

The foreground pixels can be determined by comparing $\varepsilon_k$ to $\alpha$ times an empirically determined constant. Moving objects in the image can be determined based on determining connected regions of foreground pixels with empirically determined minimum and maximum areas. The connected regions of foreground pixels can be determined based on having similar eccentricity $\varepsilon_k$. The stationary sensor can be a video camera included in a traffic infrastructure system. The vehicle can receive the image including foreground pixels from the traffic infrastructure system via a network based on a location of the vehicle. The moving objects can be projected onto a cognitive map based on the location of the video camera. The cognitive map can be determined based on the location of the vehicle, map data, vehicle sensor data and the moving objects. The vehicle can be operated based on a path polynomial based on the cognitive map. The video camera can be fixtured to acquire an unchanging field of view. The vehicle can be operated by controlling vehicle steering, braking, and powertrain.

Further disclosed is a computer readable medium, storing program instructions for executing some or all of the above method steps. Further disclosed is a computer programmed for executing some or all of the above method steps, including a computer apparatus, programmed to receive an image including foreground pixels determined based on determining an eccentricity $\varepsilon_k$ for a sequence of images acquired by a stationary sensor, determining moving objects in the image based on the foreground pixels, and operating a vehicle based on the moving objects in the image. Eccentricity $\varepsilon_k$ can be determined based on determining a mean $\mu_k$ for pixels of the sequence of images, based on a previous mean $\mu_{k-1}$ according to equation $\mu_k=(1-\alpha)\mu_{k-1}+\alpha x_k$ where $\alpha$ is an empirically determined constant. The eccentricity $\varepsilon_k$ can be determined based on determining a variance $\sigma_k^2$ for pixels of the sequence of images, based on a previous variance $\sigma_{k-1}^2$ and mean $\mu_k$ according to equation $$\sigma_k^2 = (1-\alpha)\sigma_{k-1}^2 + \frac{\alpha(x_k - \mu_k)^T(x_k - \mu_k)}{1-\alpha}.$$

The eccentricity $\varepsilon_k$ can be determined based on mean $\mu_k$ and variance $\sigma_k^2$ according to equation $$\varepsilon_k = \alpha + \frac{\alpha(x_k - \mu_k)^T(x_k - \mu_k)}{\sigma_k^2}.$$

The computer apparatus can be further programmed to determine the foreground pixels by comparing $\varepsilon_k$ to $\alpha$ times an empirically determined constant. Moving objects in the image can be determined based on determining connected regions of foreground pixels with empirically determined minimum and maximum areas. The connected regions of foreground pixels can be determined based on having similar eccentricity $\varepsilon_k$. The stationary sensor can be a red, green, blue (RGB) color video camera included in a traffic infrastructure system, for example. The vehicle can receive the image including foreground pixels from the traffic infrastructure system via a network based on a location of the vehicle. The moving objects can be projected onto a cognitive map based on the location of the video camera. The cognitive map can be determined based on the location of the vehicle, map data, vehicle sensor data and the moving objects. The vehicle can be operated based on a path polynomial based on the cognitive map. The video camera can be fixtured to acquire an unchanging field of view. The vehicle can be operated by controlling vehicle steering, braking, and powertrain.

FIG. 1 is a diagram of a traffic infrastructure system 100 that includes a vehicle 110 operable in autonomous ("autonomous" by itself in this disclosure means "fully autonomous") and occupant piloted (also referred to as non-autonomous) mode. Vehicle 110 also includes one or more computing devices 115 for performing computations for piloting the vehicle 110 during autonomous operation. Computing devices 115 can receive information regarding the operation of the vehicle from sensors 116. The computing device 115 may operate the vehicle 110 in an autonomous mode, a semi-autonomous mode, or a non-autonomous mode. For purposes of this disclosure, an autonomous mode is defined as one in which each of vehicle 110 propulsion, braking, and steering are controlled by the computing device; in a semi-autonomous mode the computing device 115 controls one or two of vehicle's 110 propulsion, braking, and steering; in a non-autonomous mode, a human operator controls the vehicle propulsion, braking, and steering.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
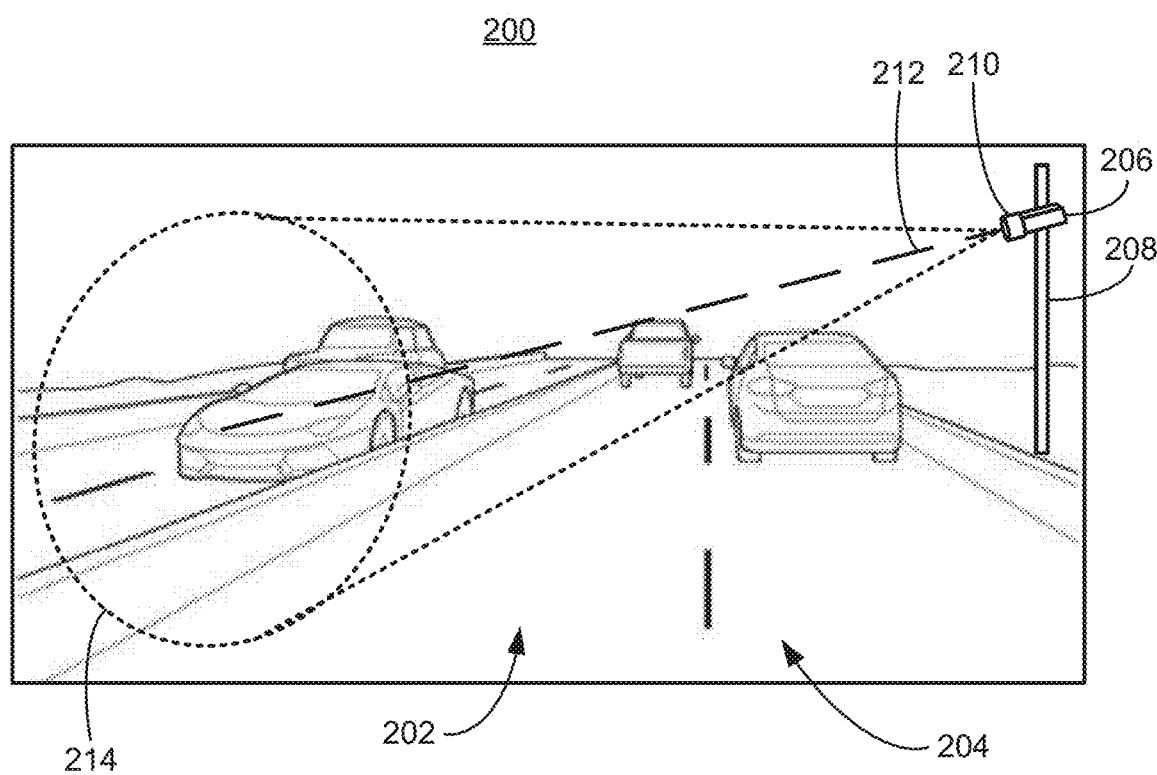
FIG. 2 is a diagram of an example traffic scene including a stationary camera.

FIG. 2 is a diagram of an example image 200 of a traffic scene, rendered in black and white to comply with to comply with 37 C.F.R. § 1.84(a)(1). This example image 200 includes a roadway 202 and traffic objects 204. Traffic objects can include vehicles, pedestrians, bicycles, animals or debris, etc. Image 200 also includes a stationary video camera 206, which can be mounted on a mounting pole 208 or any other appropriate structure including traffic signals or buildings. Stationary video camera 206 has a lens 210 having a field of view 214, represented by dotted lines, and an optical axis 212, represented by a dashed line. The field of view 214 can be represented by a magnification of lens 210, combined with an optical axis 212, defined as a direction in 3D space located at a 3D location of an optical center of lens 210. Optical axis 212 can represent the center in 3D space of field of view 214.

Field of view 214 determines the portion of 3D space captured in an image, i.e., a digital image, by stationary video camera 206, and thereby acquired as a video image by stationary video camera 206. The 3D location and pose of stationary video camera 206, where 3D location is defined by x, y, z coordinates with respect to latitude, longitude and altitude and pose is defined by $\rho, \phi, \theta$ angles of rotation with respect to axes defined by latitude, longitude and altitude, can be determined empirically. Based on determining the 3D location and pose of stationary video camera 206, the field of view 214 can be determined.

Because the field of view 214 of stationary video camera 206 does not change, real world 3D distances from stationary video camera 206 to real world background locations can be determined by physically measuring the real world 3D location of objects such as roadways represented in a video image acquired by stationary video camera 206, for example. Other techniques for determining real world 3D locations of objects include photogrammetry, where a priori information regarding the size of an object can be used to determine the real world 3D location of the object in relation to the stationary video camera. Once the real world 3D locations of objects within the field of view of stationary video camera 206 are determined, the 3D locations can be assigned to pixel coordinates (i, j) in a video image, for example. The 3D location information can be stored at a computing device included in a traffic infrastructure system 100.

Stationary video camera 206 can be part of the traffic infrastructure system 100. A traffic infrastructure system as that term is used herein includes a network of computing devices and sensors that acquire data regarding vehicle traffic in areas that include roadways and portions of roadways and communicate with vehicles included in the vehicle traffic. A traffic infrastructure system 100 can include communications networks and computing devices that monitor and direct vehicle traffic over areas such as cities, neighborhoods, districts, or highways, for example. A traffic infrastructure system 100 can include sensors, like stationary video camera 206, to record video data of traffic and process the video data and transmit it to computing devices in communication with many stationary video cameras 206, for example, which can use the video data of traffic to determine traffic patterns and rates. Traffic infrastructure system 100 also can include wireless communications equipment that permits the traffic infrastructure system 100 to form ad-hoc networks with a vehicle 110 based on location in a geographic area defined by the traffic infrastructure system. A traffic infrastructure system 100 can include a plurality of transmitting and receiving stations, for example, and manage the ad-hoc networks in the same fashion as cellular telephone networks manage cell phone communications. For example, a traffic infrastructure system 100 can include communications from a server 120 with a vehicle 110 using V-to-I interface 111 whenever vehicle 110 was within range of traffic infrastructure system 100, e.g., communications elements included in the network 130, wherein "within range" is defined as the area within which vehicle 110 can receive a usable signal from a traffic infrastructure system 100 transceiver.

Figure 3:
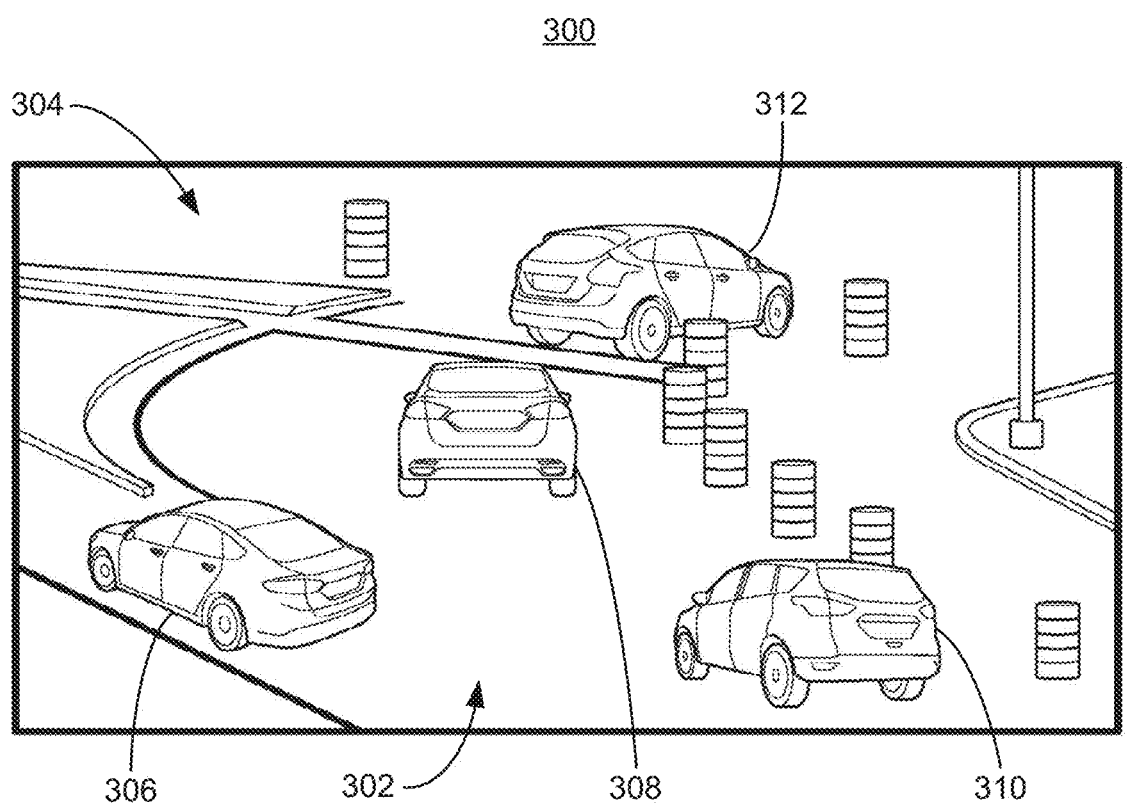
FIG. 3 is a diagram of an example image of a traffic scene acquired by a stationary camera

FIG. 3 is an example video image 300 acquired by a stationary video camera 206, rendered in black and white to comply with Patent Office regulations. Video image 300 includes images of a roadway 302, background objects 304, including curbs, barrels and poles, etc., and foreground objects including traffic vehicles 306, 308, 310, 312.

Determining foreground and background objects in a video image 300 can be used by a traffic infrastructure system 100 for a variety of tasks including traffic flow analysis, pedestrian tracking, and vehicle 110 operation, for example. Foreground and background objects in a video image 300 can be determined by acquiring and storing a first video image 300 at computing device 115. A second video image 300 can be acquired and the first video image 300 subtracted from the second video image 300. The subtracted result image contains zeros at pixel locations where the data did not change between the first and second video images 300 and non-zero values at pixel locations that did change. The non-zero values are caused by moving or foreground objects in the second video image 300 causing non-zero pixel values. Non-moving or background objects are subtracted out of the result image, leaving only the foreground objects formed by connected regions of non-zero pixels.

Simple background subtraction can separate foreground pixels from background pixels; however, changing light levels and other changes in appearance of the background can require that a new background image be acquired. Knowing when to acquire a new background image can be difficult if the scene includes moving vehicles, for example. Other techniques for foreground/background can rely on thresholds or other empirically determined parameters that can require adjustment to track changing conditions. Techniques discussed herein calculate an eccentricity ε of the pixels of a stream of video images and thereby determine foreground and background pixels in a result image derived from the stream of video images without requiring adjustment to track changing conditions. A stream of video images can be defined as a plurality of video images acquired by a video camera at successive time intervals.

Calculation of eccentricity ε based on an input stream of video images can be performed more efficiently by a computing device than other techniques discussed above to determine image foreground/background. For example, calculation of eccentricity ε based on an input stream of video images can be performed at a rate of hundreds of video images per second on readily available computing devices. Calculation of eccentricity ε is free of complex user-defined parameters and free of prior assumptions about the data and its distribution.

Eccentricity ε is a metric, i.e., value determined as explained below, that indicates how different a pixel is from past samples of the same pixel location. Regarding a set of samples of the same pixel location as a vector of variables in n-dimensions, the value of eccentricity ε increases as these variables deviate from their "normal" behavior. For foreground detection, all "abnormal" or "anomalous" pixels are labeled as foreground, based on the intensities of the pixels. The eccentricity ε at time instant k can be given by the equation:

$$\varepsilon_k = \alpha + \frac{\alpha(x_k - \mu_k)^T(x_k - \mu_k)}{\sigma_k^2} \tag{1}$$

where α is an empirically determined dimensionless constant (usually a small value, e.g. 0.005) that represents a learning rate for the background model, wherein learning rate indicates what portion of the eccentricity $\varepsilon_k$ is based on the current pixel $x_k$, and therefore how quickly the eccentricity $\varepsilon_k$ can adapt to changes in the input video data stream, for example, and where current pixel $x_k$ is a vector that includes the intensities of a video data stream sample at a time k. Variables $\mu_k$ and $\sigma_k^2$ are the mean and variance of the current pixel $x_k$ at time instant k, recursively updated according to equations:

$$\mu_k = (1-\alpha)\mu_{k-1} + \alpha x_k \tag{2}$$

$$\sigma_k^2 = (1-\alpha)\sigma_{k-1}^2 + \frac{\alpha(x_k - \mu_k)^T(x_k - \mu_k)}{1-\alpha} \tag{3}$$

A pixel $x_k$ is determined to be a foreground pixel when the calculated eccentricity $\varepsilon_k$ at time instant k is higher than 5α.

Figure 4:
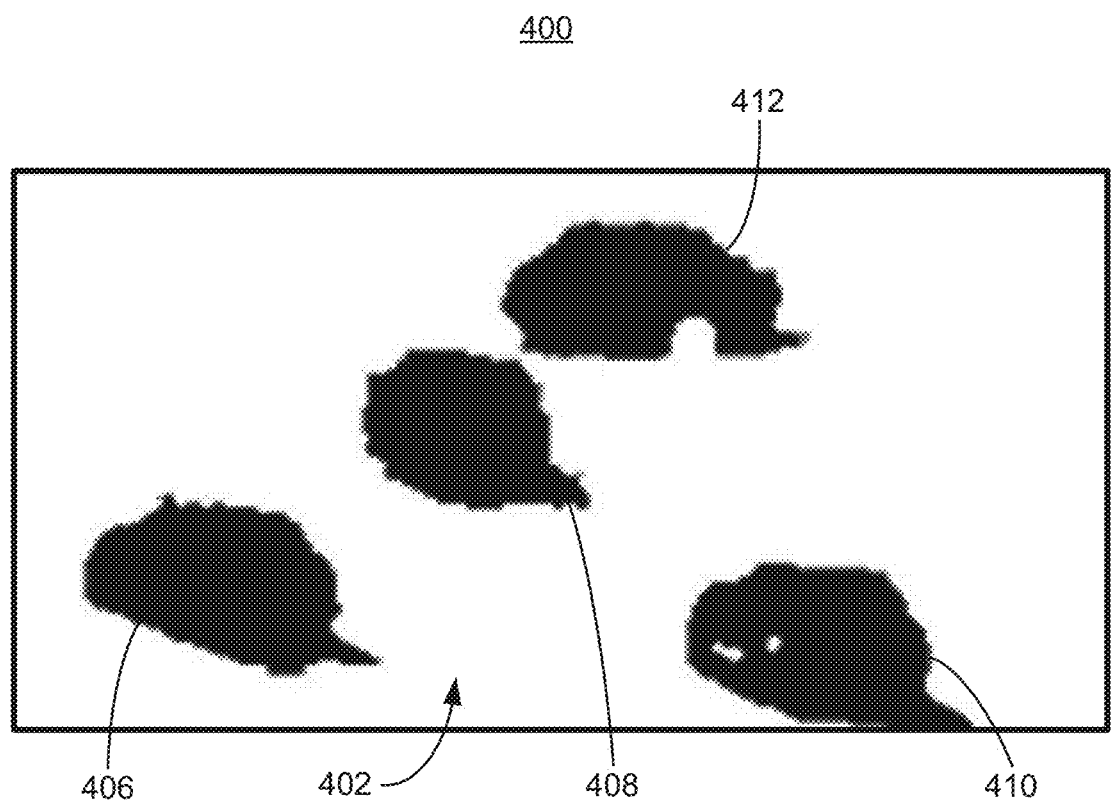
FIG. 4 is a diagram of an example image including determined moving objects.

FIG. 4 is an example eccentricity $\varepsilon_k$ image 400 that includes foreground regions 406, 408, 410, 412 on a background 402 of pixels with value zero. Foreground regions 406, 408, 410, 412 are determined based on applying equations (1), (2), and (3) to a stream of video images that includes video image 300, for example. Foreground pixels in eccentricity $\varepsilon_k$ image 400 determined by equations (1), (2), and (3) can be grouped into foreground regions 406, 408, 410, 412 by determining connected regions of foreground pixels, where foreground pixels are determined to be connected when they are 8-way adjacent, which includes diagonally adjacent. Foreground regions 406, 408, 410, 412 can represent objects that are moving against a background, for example vehicles or pedestrians on or near a roadway.

Traffic infrastructure systems 100 can include a plurality of stationary video cameras providing eccentricity $\varepsilon_k$ images 400, e.g., to a plurality of computing devices via the network 130. For example, computers 115 in a respective plurality of vehicles 110 can receive eccentricity $\varepsilon_k$ images 400. Software programs included in the plurality of computing devices 115 can identify, based on information regarding the location, pose and field of view of each stationary video camera 206 and the location, speed and direction of travel of each vehicle 110, one or more specific eccentricity $\varepsilon_k$ images 400 that are relevant to the respective vehicles 110. A computing device 115 in each vehicle 110 can then download, via the network 130, only those eccentricity $\varepsilon_k$ images 400 determined to be relevant to the respective vehicle 110, thereby minimizing network bandwidth consumption. Each stationary video camera 206 can include information along with the eccentricity $\varepsilon_k$ image 400 that identifies the location, pose, and field of view of the stationary video camera that acquired the eccentricity $\varepsilon_k$ image 400.

Figure 5:
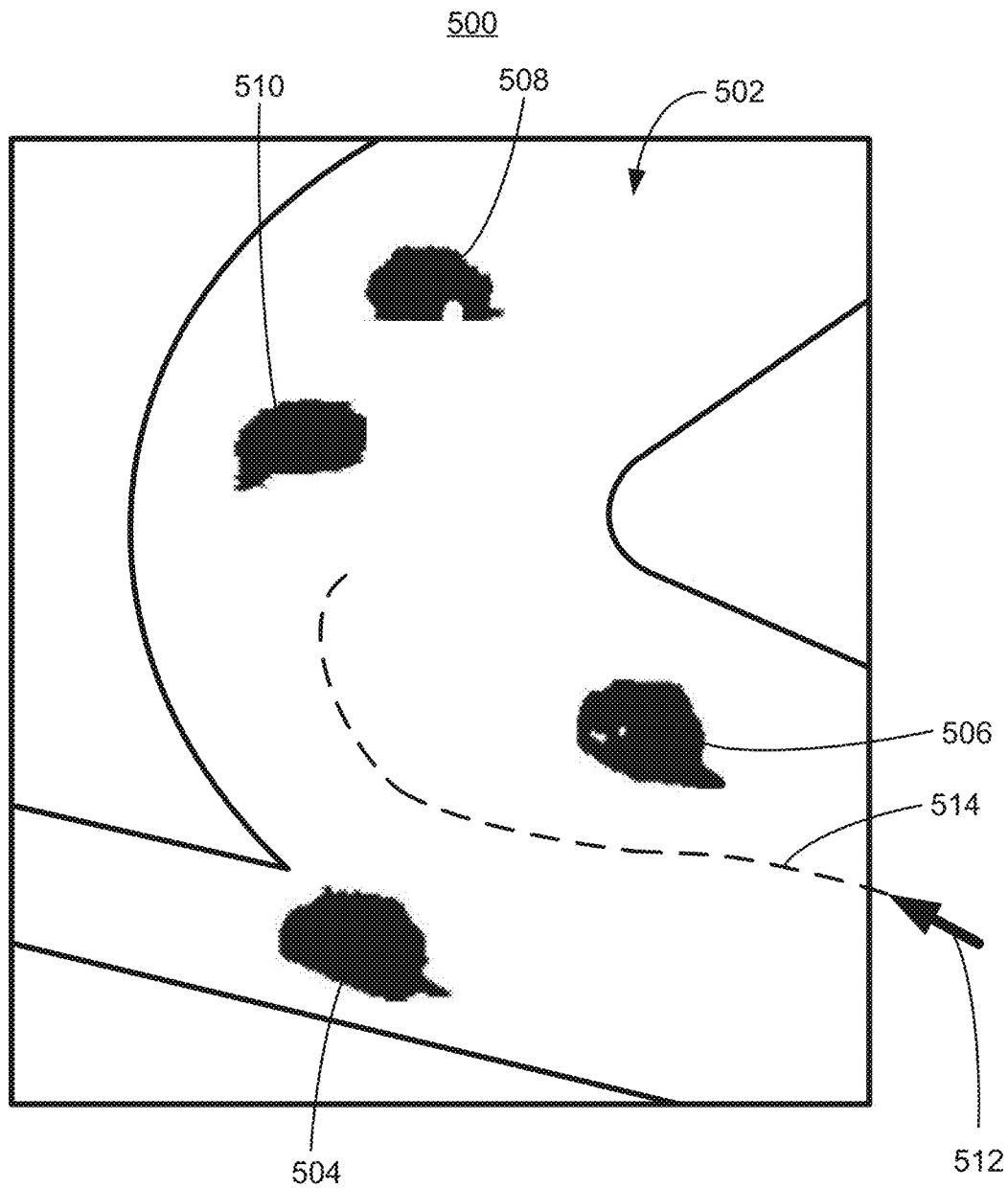
FIG. 5 is a diagram of an example cognitive map.

FIG. 5 is an example cognitive map 500 determined by computing device 115 in vehicle 110 based on an eccentricity $\varepsilon_k$ image 400 and 3D location data downloaded from a traffic infrastructure system. As discussed above in relation to FIG. 3, 3D location data can be used to determine the real world 3D locations of objects in result image 400 based on the pixel coordinates (i, j) of the objects. A cognitive map is a representation of a local spatial environment that specifies locations of objects in the environment relative to one another.

In the example of FIG. 5, cognitive map 500 is a top-down view of a local spatial environment that includes regions and objects relevant to vehicle 110 navigation including a roadway 502 and vehicles 504, 506, 508, 510. A cognitive map 500 can be determined based on information regarding the location and direction of travel of a vehicle 110 and stored map data. For example, vehicle 110 can be located at, and traveling in the direction indicated by, arrow 512. Because cognitive map 500 is constructed based on real world 3D coordinates, real world 3D locations of objects from eccentricity $\varepsilon_k$ image 400 can be located in cognitive map 500. Computing device 115 can input vehicle 110 location and direction of travel and determine features of cognitive map 500 including roadway 502 based on downloaded or stored map information and data from vehicle sensors 116. For example, a lidar sensor 116 can measure distances that confirm the presence of roadway 502.

Computing device 115 can include information regarding foreground regions 406, 408, 410, 412 from an eccentricity $\varepsilon_k$ image 400 downloaded from a traffic infrastructure system in a cognitive map 500. Because the stationary video camera has included information regarding the 3D location, pose and field of view along with the eccentricity $\varepsilon_k$ image 400, computing device 115 can project foreground regions 406, 408, 410, 412 onto cognitive map 500 as moving objects 504, 506, 508, 510 by determining where the pixels of the foreground regions 406, 408, 410, 412 would intersect roadway 502 based on the pixel coordinates (i, j) of the foreground regions 406, 408, 410, 412 and the real world 3D location of background pixel locations including roadway 502. By projecting foreground regions 406, 408, 410, 412 onto appropriate locations in cognitive map 500, moving objects 504, 506, 508 510 can be identified by computing device 115 based on location, size and shape, and used by computing device 115 to determine a path upon which to operate vehicle 110 on roadway 502 that avoids moving objects 504, 506, 508, 510. By tracking moving objects 504, 506, 508, 510 in a series of result images 500 acquired at successive time instants, a speed and direction can be determined for each moving object 504, 506, 508, 510 can be determined and used by computing device 115 to determine a path for vehicle 110 to travel on roadway 502 that avoids a collision or near-collision with moving objects 504, 506, 508, 510.

Computing device 115 can operate vehicle 110 based on a path polynomial specifying a path 514 (dashed line) determined, at least in part, on moving objects 504, 506, 508, 510. A path polynomial is a mathematical representation of real world 3D location and motion including rates of change of lateral and longitudinal accelerations, for example. Computing device 115 can determine a path polynomial 115 based on a current location, speed and direction for vehicle 110, represented by arrow 512. Computing device can then determine a polynomial function of degree three or less in segments called splines, wherein the segments are constrained to fit smoothly together by constraints on first derivatives to represent predicted successive locations of vehicle 110. Constraints on path polynomial 514 in real world 3D coordinates include upper and lower limits on lateral and longitudinal accelerations and upper limits on rates of change of lateral and longitudinal accelerations (jerk) required to operate vehicle 110 along path polynomial 514. Path polynomial 514 can also be constrained to stay in roadway 502 and to avoid moving objects 504, 506, 508, 510 while maintaining target speeds. Computing device 115 can operate vehicle 110 to travel along a path 514 according to a determined path polynomial by sending commands to controllers 112, 113, 114 to control steering, brakes and powertrain of vehicle 110 to cause vehicle 110 to travel along the path 514 on a roadway 502 avoiding moving objects 504, 506, 508, 510 at a target speed.

Computing device 115 can determine a path polynomial for a path 514 based on stored map data, location data from vehicle sensors 116 including GPS and accelerometers, radar, lidar and video sensors. Computing device 115 can process data from radar, lidar and video sensors to determine objects in fields of view based on each of the radar, lidar and video sensors using machine vision techniques including neural networks and Bayesian statistics, for example. Using information based on the fields of view of each sensor 116, the objects can be located in a cognitive map 500. Computing device can then determine a path polynomial in cognitive map 500 that permits vehicle 110 to travel to a destination while avoiding collision or near-collision with the objects by estimating free space regions and non-free space regions included in cognitive map 500. Free space regions are regions of a cognitive map 500 in which a vehicle 110 can be predicted to travel unimpeded on a roadway surface.

Computing device 115 can determine destinations in cognitive map 500 for vehicle 110 travel that will be a step in accomplishing a higher level goal-directed activity like picking up a passenger and dropping them at a destination, for example. Non-free space regions included in a cognitive map 500 can include non-roadway regions and regions surrounding objects, both fixed objects like traffic cones and barriers, and, when objects are determined to be moving, locations to which the objects are likely to move, for example predicting travel for vehicles, pedestrians and cyclists. Locations in a cognitive map 500 to which the objects are likely to move can be determined based on repeated observations of the objects over time, for example, to determine object location probabilities based on determined object speed and direction. Path polynomials can be determined to direct vehicle 110 to travel within a free space region to reach a destination while avoiding non-free space regions. Data, and therefore detected objects, from vehicle sensors 116 including radar, lidar and video sensors are limited to the fields of view of each of the radar, lidar and video sensors. Adding data regarding moving objects 504, 506, 508, 510 to a cognitive map 500 can improve the cognitive map 500 by including objects in addition to objects visible in the fields of view of vehicle sensors 116.

Figure 6:
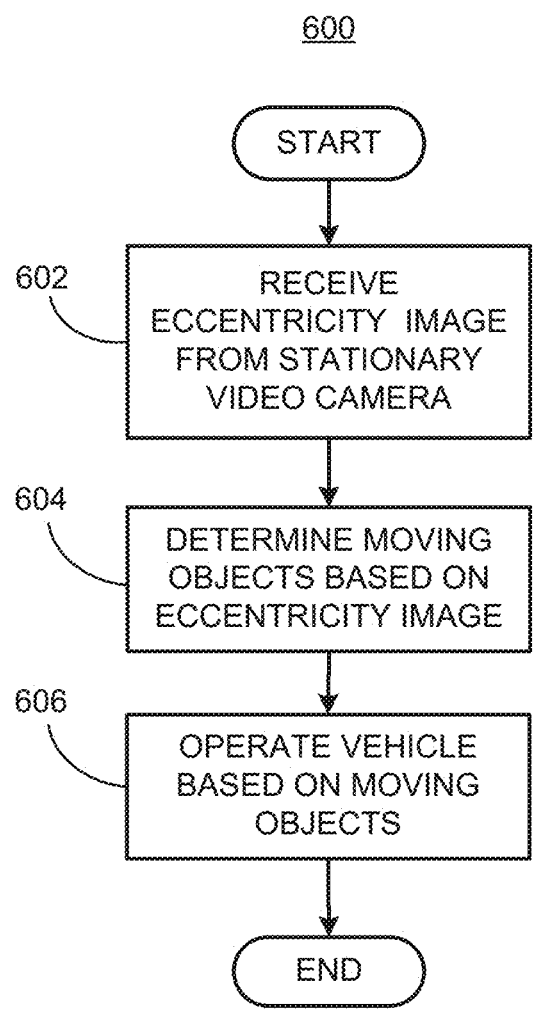
FIG. 6 is a flowchart diagram of an example process to operate a vehicle based on moving objects.

FIG. 6 is a diagram of a flowchart, described in relation to FIGS. 1-5, of a process 600 for operating a vehicle based on determining moving objects in an image. Process 600 can be implemented by a processor of computing device 115, taking as input information from sensors 116, and executing commands and sending control signals via controllers 112, 113, 114, for example. Process 600 includes multiple blocks taken in the disclosed order. Process 600 also includes implementations including fewer blocks or can include the blocks taken in different orders.

Process 600 begins at block 602, in which a computing device 115 included in a vehicle 110 receives an eccentricity $\varepsilon_k$ image 400 from a stationary video camera 206. As discussed in relation to FIGS. 2-4 above, stationary video camera 206 can be included in a traffic infrastructure system that determines when to transmit eccentricity $\varepsilon_k$ image 400 from stationary video camera 206 to vehicle 110. A traffic infrastructure system can also transmit eccentricity $\varepsilon_k$ image 400 in response to a query transmitted by vehicle 110 to a traffic infrastructure system via an ad hoc network, for example. In addition to eccentricity $\varepsilon_k$ image 400, a traffic infrastructure system can transmit location, pose and field of view information regarding the stationary video camera 206.

At block 604 computing device 115 can combine eccentricity $\varepsilon_k$ image 400 with a cognitive map 500 based on combining the location, pose and field of view with information regarding the real world 3D locations of objects in the field of view to determine moving objects 504, 506, 508, 510 in or near a roadway 502 that a vehicle 110 is traveling on as discussed above in relation to FIGS. 4 and 5.

At block 606 computing device 115 can operate vehicle 110 by determining a path polynomial 514 based on determining free space regions and non-free space regions in a cognitive map 500 and, at least in part, on moving objects 504, 506, 508, 510 discussed above in relation to FIG. 5, above. Computing device 115 can operate vehicle 110 to travel along the path polynomial 514 by sending commands to controllers 112, 113, 114 to control vehicle 110 steering, braking and powertrain. Following this block process 600 ends.

Figure 7:
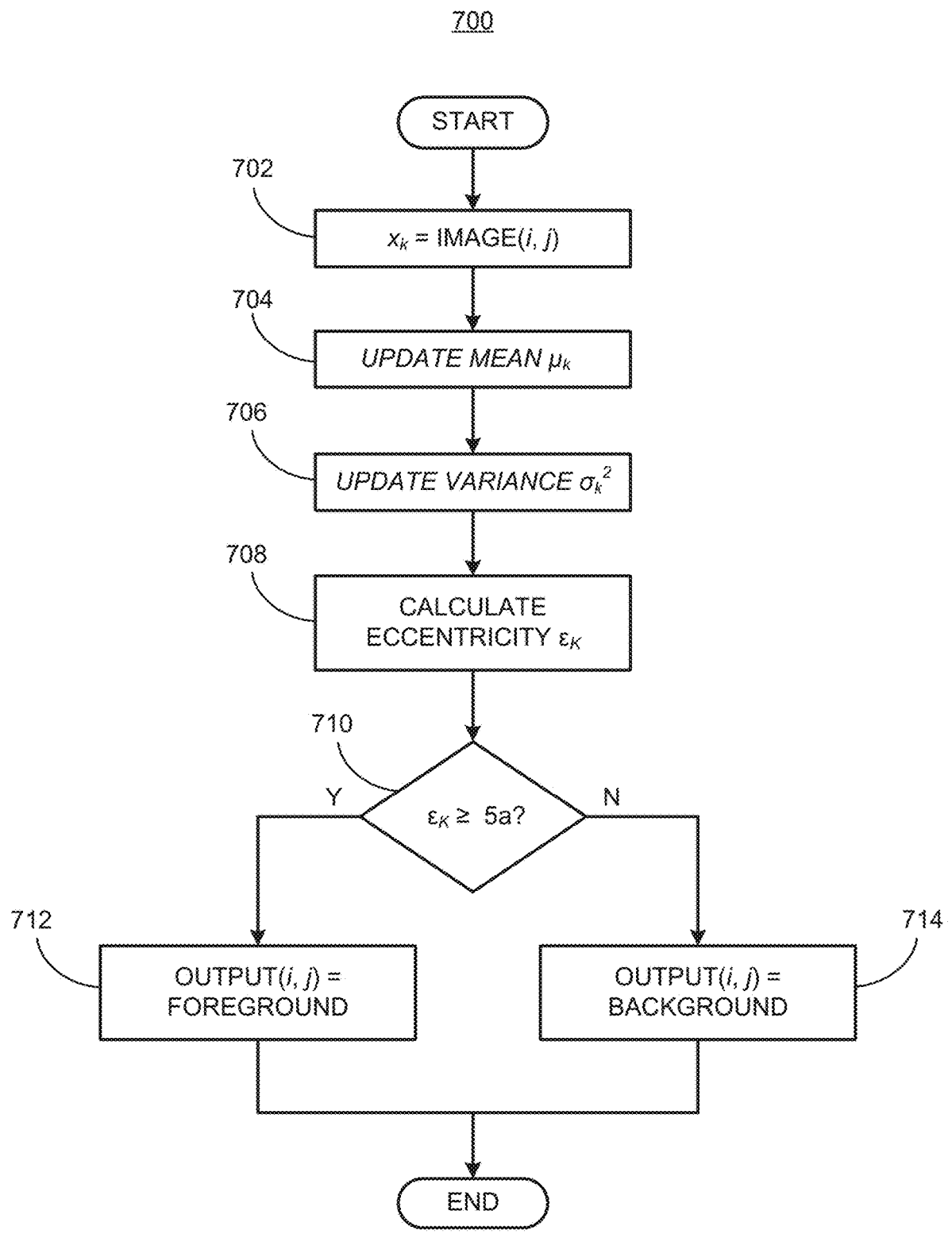
FIG. 7 is a flowchart diagram of an example process to determine foreground objects.

FIG. 7 is a diagram of a flowchart, described in relation to FIG. 3, of a process 700 for operating a vehicle based on determining moving objects in an image. Process 700 can be implemented by a processor of computing device 115, taking as input information from sensors 116, and executing commands and sending control signals via controllers 112, 113, 114, for example. Process 700 includes multiple blocks taken in the disclosed order. Process 700 also includes implementations including fewer blocks or can include the blocks taken in different orders.

Process 700 begins at block 702, where a computing device 115 included in a vehicle 110 determines a sample pixel $x_k$ from an input image(i, j) from a stationary video camera. Process 700 describes a process applied to each pixel $x_k$ of an input image(i, j) from a stationary video camera. The stationary video camera can be an RGB color video camera, for example, wherein the pixels are RGB pixels. The pixels $x_k$ can be selected in raster scan order for example, where rows of the input image are scanned from top to bottom in order. Process 700 is repeated for each pixel of input image(i, j).

At block 704 computing device 115 updates mean $\mu_k$ according to equation (2), above, based on pixel $x_k$ of image(i, j).

At block 706 computing device 115 updates the variance $\sigma_k^2$ according to equation (3), above, based on pixel $x_k$ of image(i, j) and the mean $\mu_k$.

At block 708 computing device 115 calculates an eccentricity image $\varepsilon_k$ according to equation (1), above, based on pixel $x_k$ of image(i, j), the mean $\mu_k$ and the variance $\sigma_k^2$.

At block 710 computing device 115 compares the pixels of eccentricity image $\varepsilon_k$ with five times an empirically determined constant $\alpha$. If the value of a pixel of eccentricity image $\varepsilon_k$ is greater than or equal to $5\alpha$ process 700 branches to block 612. If the value of the pixel is less than $5\alpha$ process 700 branches to block 614.

At block 712 eccentricity image $\varepsilon_k$ is calculated by setting output(i, j) equal to foreground. Following block 712 process 700 ends.

At block 714 eccentricity image $\varepsilon_k$ is calculated by setting output(i, j) equal to background. Following block 714 process 700 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

What is claimed is:

1. A method, comprising:
   receiving an image including foreground pixels, the foreground pixels determined based on determining an eccentricity $\varepsilon_k$ that is a measure of a difference of intensities of respective pixels from past intensity values, for a sequence of images acquired by a stationary sensor;
   determining moving objects in the image based on the foreground pixels; and
   operating a vehicle based on the moving objects in the image.

2. The method of claim 1, further comprising determining eccentricity $\varepsilon_k$ based on determining a mean $\mu_k$ for pixels of the sequence of images, based on a previous mean $\mu_{k-1}$ according to equation $\mu_k=(1-\alpha)\mu_{k-1}+\alpha x_k$ where $\alpha$ is an empirically determined constant.

3. The method of claim 2, further comprising determining the eccentricity $\varepsilon_k$ based on determining a variance $\sigma_k^2$ for pixels of the sequence of images, based on a previous variance $\sigma_{k-1}^2$ and the mean $\mu_k$ according to equation $$\sigma_k^2 = (1-\alpha)\sigma_{k-1}^2 + \frac{\alpha(x_k-\mu_k)^T(x_k-\mu_k)}{1-\alpha}.$$

4. The method of claim 3, further comprising determining the eccentricity $\varepsilon_k$ based on the mean $\mu_k$ and the variance $\sigma_k^2$ according to equation $$\varepsilon_k = \alpha + \frac{\alpha(x_k-\mu_k)^T(x_k-\mu_k)}{\sigma_k^2}.$$

5. The method of claim 4, further comprising determining the foreground pixels by comparing $\varepsilon_k$ to $\alpha$ times an empirically determined constant.

6. The method of claim 1, further comprising determining moving objects in the image based on determining connected regions of foreground pixels with empirically determined minimum and maximum areas.

7. The method of claim 6, wherein the connected regions of foreground pixels are determined based on having similar eccentricity $\varepsilon_k$.

8. The method of claim 1, wherein the stationary sensor is a red, green blue (RGB) color video camera included in a traffic infrastructure system.

9. The method of claim 8, wherein the vehicle receives the image including foreground pixels from the traffic infrastructure system via a network based on a location of the vehicle.

10. A system, comprising a processor; and
   a memory, the memory including instructions to be executed by the processor to:
      receive an image including foreground pixels, the foreground pixels determined based on determining an eccentricity $\varepsilon_k$, that is a measure of a difference of intensities of respective pixels from past intensity values, for a sequence of images acquired by a stationary sensor;
      determining moving objects in the image based on the foreground pixels; and
      operating a vehicle based on the moving objects in the image.

11. The system of claim 10, further comprising determining the eccentricity $\varepsilon_k$ based on determining a mean $\mu_k$ for pixels of the sequence of images, based on a previous mean $\mu_{k-1}$ according to equation $\mu_k=(1-\alpha)\mu_{k-1}+\alpha x_k$.

12. The system of claim 11, further comprising determining the eccentricity $\varepsilon_k$ based on determining a variance based on $\sigma_k^2$ for pixels of the sequence of images, based on a previous variance $\sigma_{k-1}^2$ and the mean $\mu_k$ according to equation $$\sigma_k^2 = (1-\alpha)\sigma_{k-1}^2 + \frac{\alpha(x_k-\mu_k)^T(x_k-\mu_k)}{1-\alpha}.$$

13. The system of claim 12, further comprising determining the eccentricity $\varepsilon_k$ based on the mean $\mu_k$ and the variance $\sigma_k^2$ according to equation $$\varepsilon_k = \alpha + \frac{\alpha(x_k-\mu_k)^T(x_k-\mu_k)}{\sigma_k^2}.$$

14. The system of claim 13, further comprising determining the foreground pixels by comparing $\varepsilon_k$ to $\alpha$ times an empirically determined constant.

15. The system of claim 10, further comprising determining moving objects in the image based on determining connected regions of foreground pixels with empirically determined minimum and maximum areas.

16. The system of claim 15, wherein the connected regions of foreground pixels are determined based on having similar eccentricity $\varepsilon_k$.

17. The system of claim 10, wherein the stationary sensor is a red, green blue (RGB) color video camera included in a traffic infrastructure system.

18. The system of claim 17, wherein the vehicle receives the image including foreground pixels from the traffic infrastructure system via a network based on a location of the vehicle.

19. A system, comprising:
   means for controlling vehicle steering, braking and powertrain;
   computer means for:
      receiving an image including foreground pixels the foreground pixels determined based on determining an eccentricity $\varepsilon_k$ that is a measure of a difference of intensities of respective pixels from past intensity values, for a sequence of images acquired by a stationary sensor;
      determining moving objects in the image based on the foreground pixels; and
      operating a vehicle based on the moving objects in the image and based on the means for controlling vehicle steering, braking and powertrain.

20. The system of claim 19, further comprising determining the eccentricity $\varepsilon_k$ based on determining a mean $\mu_k$ based on equation $\mu_k=(1-\alpha)\mu_{k-1}+\alpha x_k$.

* * * * *